United States Patent [19]

Bard et al.

[11] 4,264,421

[45] Apr. 28, 1981

[54] PHOTOCATALYTIC METHODS FOR PREPARING METALLIZED POWDERS

[75] Inventors: Allen J. Bard; Wendell W. Dunn, both of Austin, Tex.; Bernhard Kraeutler, Zurich, Switzerland

[73] Assignee: Board of Regents, University of Texas System, Austin, Tex.

[21] Appl. No.: 43,811

[22] Filed: May 30, 1979

[51] Int. Cl.³ .......................................... B01J 19/12
[52] U.S. Cl. ........................... 204/157.1 R; 427/53.1; 427/54.1
[58] Field of Search ................. 204/157.1 R; 427/217, 427/53.1, 54.1

[56] References Cited

U.S. PATENT DOCUMENTS

| | | | |
|---|---|---|---|
| 3,284,329 | 11/1966 | Aftandilian | 204/157.1 R |
| 3,635,761 | 1/1972 | Haag et al. | 427/217 |
| 4,130,506 | 12/1978 | Collier et al. | 427/217 |
| 4,151,311 | 4/1979 | Feldstein | 427/53.1 |

FOREIGN PATENT DOCUMENTS 17790 of 1913 United Kingdom ............. 204/157.1 R

*Primary Examiner*—Howard S. Williams
*Attorney, Agent, or Firm*—Arnold, White & Durkee

[57] ABSTRACT

Photocatalytic methods are disclosed for the preparation of metallized powders. Specifically, such methods include the photodeposition of platinum, copper and other metals on $TiO_2$ powder and other semiconductor powders. The powders thus prepared are particularly useful as catalysts.

58 Claims, No Drawings

PHOTOCATALYTIC METHODS FOR PREPARING METALLIZED POWDERS

BACKGROUND OF THE INVENTION

In the copending application of Drs. Bard and Kraeutler, Ser. No. 024,520, there are described methods for the heterogeneous photocatalytic decarboxylation of saturated carboxylic acid on several n-type semiconductor powders. Several specific semiconductor powders were disclosed as particularly advantageous for use in connection with those methods. Included were platinized $TiO_2$ powders, such as anatase, doped and anatase, undoped.

The present invention relates to the preparation of such powders by photocatalytic deposition of metal (such as platinum in the above-noted examples) to produce powders which are especially useful as supported metal catalysts. The techniques of this invention produce catalyst materials consisting of finely dispersed metal on a semiconductor support. These materials have been found to be useful as catalysts for the purposes mentioned in the copending application referred to above, and for other processes.

The methods of this invention are also useful in depositing metal ions from a liquid having a dilute concentration of such metal ions, in situations wherein it would otherwise be difficult to rid the liquid of the metal ions. For example, industrial effluents frequently contain small quantities of copper. Since it is difficult to recover the copper, the valuable metal is lost and, perhaps more important, the metal contaminates or destroys organisms exposed to such streams.

In the past, it has been known to deposit metal on semiconductors. The photovoltaic plating of silver or copper on the inside of a silicon p-n junction has been described in the prior art, as has been the photoreduction of silver and palladium on n-type titanium dioxide. Similarly, the photoreduction of copper on $n-TiO_2$ and $n-SrTiO_3$ electrodes has been described in the prior art, frequently in connection with photographic studies.

Phillipp et al, U.S. Pat. No. 3,826,726, describes the deposition of metallic elements by irradiating aqueous solutions or suspensions of metal salts with high energy particles, such as electrons, protons, ions and neutrons obtained from particle accelerators and radioactive sources.

So far as applicants are aware, however, the prior art does not describe any such method suitable for the preparation of metallized powders wherein the metal is highly dispersed thereon, or for the consequent removal of metal ions from a reaction mixture.

It would be advantageous to provide such methods for the reasons mentioned above. Such methods are provided by this invention.

SUMMARY OF THE INVENTION

In accordance with this invention, a reaction mixture comprising semiconductor powders, such as $TiO_2$ and $WO_3$, in a metallizing solution which comprises metal ions such as platinum, copper or palladium is provided. The metallizing solution desirably contains acetate.

The reaction mixture thus provided is irradiated at an intensity and for a time sufficient to result in the deposition of metal from the metallizing solution onto the powders.

The invention is useful in many contexts of use in preparing metallized powders which are especially useful as catalysts, for example in the photocatalytic decarboxylation of saturated carboxylic acid.

The invention is also useful in ridding liquids having dilute metal ion concentrations, of the metal ions.

DESCRIPTION OF PREFERRED EMBODIMENTS

The invention will be described in terms of preferred embodiments which represent the best mode known to the applicants at the time of this application.

In accordance with such preferred embodiments, applicants provide an inorganic oxide powder such as an n-type titanium dioxide ($TiO_2$) powder. Particularly preferred for use in connection with the invention are powders such as anatase, reduced and anatase, unreduced. Also useful in connection with the methods of the invention are powders such as tungstic oxide, $WO_3$, and titanium dioxide in the rutile crystalline form, reduced or unreduced. The reduced and unreduced forms of the powder are similar to the doped and undoped forms mentioned in the copending application Ser. No. 024,520.

In one embodiment illustrating homogeneous photodecomposition, inorganic oxide powders having a wide band gap are employed.

Further in accordance with the invention, a metallizing solution is prepared. The metallizing solution comprises, in a suitable solvent, the metal which is desired to be deposited onto the powder. For example, the metallizing solution may contain a salt of a metal such as platinum, palladium or copper in a solvent such as acetic acid.

After the inorganic oxide powder and the metallizing solution have been provided, the powder is suspended in the metallizing solution to form a reaction mixture.

Then it may be desired to adjust the pH of the reaction mixture since at least too low a pH may inhibit the efficiency of the reaction. It may also be desired to remove oxygen or carbon dioxide, or both, from such mixture, since the efficiency of the reaction is inhibited by the presence of oxygen. Removal of oxygen may be done, for example, by bubbling nitrogen through the liquid reaction mixture, while the pH may be adjusted by any conventional method such as by adding $Na_2CO_3$ or acetic acid.

While it is not necessary to have highly elevated temperatures in order that the methods of this invention may satisfactorily proceed, some elevation of the reaction mixture from room temperature may be desirable or necessary. Applicants have found that a temperature of about 55°–60° C. is particularly advantageous.

The reaction mixture often assumes a bright color because of the presence of metal ions.

Further in accordance with the invention, the reaction mixture containing the suspended powder is then irradiated with visible or ultraviolet light of suitable intensity and for a suitable period of time, e.g., until a distinct fading of color occurs in the reaction mixture or a darkening of the powders occurs. Such a fading of color indicates dissipation of metal ions from the solution and darkening of the powders indicates metal deposition thereon. In many contexts of use, metallized powders suitable for use as catalysts may be prepared prior to deposition of sufficient metal ions from the mixture to cause a noticeable fading of color. This may be especially true where a concentrated metallizing solution is employed. For example, irradiation with a 2500 W Hg-Xe lamp operated at 1600 W, for less than about four hours, has been found to be satisfactory in connection with these methods.

Irradiation of the solution containing the powders under the conditions indicated above is effective to result in the evolution of carbon dioxide, and in the formation of a metallized powder wherein the metal is finely and highly dispersed throughout the powder.

The resulting powder may then desirably be dried to obtain a metallized semiconductor powder useful as a catalyst, for example a catalyst useful for the photocatalytic decarboxylation of saturated carboxylic acids.

In order that the invention may be more clearly understood, preferred embodiments will be further described in terms of the following examples, which should not be construed to limit the scope of this invention.

EXAMPLE 1

2.02 grams of lightly doped anatase powder were provided. The doped powder was produced from undoped titanium dioxide in the anatase crystalline form. The powder, obtained from Matheson, Coleman and Bell, was found by X-ray to be greater than 99% pure. By sieves, the particle size was selected as 125–250 micrometers, and the grain size was approximately 0.2 micrometers by scanning electron microscopy. The surface area was determined by BET measurements to be in excess of 15 $m^2/g$.

A metallizing solution was prepared by mixing 0.1 M hexachloroplatinic acid in 0.1 M hydrochloric acid. The metallizing solution was neutralized with sodium carbonate and then brought to a pH of about 4 by the addition of acetic acid.

The powder thus provided was suspended in the metallizing solution to form a reaction mixture. The reaction mixture was thoroughly flushed with nitrogen to remove oxygen and carbon dioxide.

The reaction mixture was then heated to approximately 55° C., this temperature being accurate within ±3° C. It was observed that the reaction mixture was bright orange in color.

The reaction mixture was then irradiated with a 2500 W Hg-Xe lamp, operated at 1600 W, while a low stream of nitrogen carried the evolving carbon dioxide (measured at approximately 400 $\mu$mol/h) into a saturated solution of barium hydroxide in 1 M sodium hydroxide. A precipitate of $BaCO_3$ was formed. The irradiation of the reaction mixture was continued for 3.6 hours at which time it was observed that the color of the solution had largely faded and the grayish powder had darkened significantly. A black spot of platinum was also noticed at the inside of the cell wall where the light beam was incident.

Transfer of the reaction mixture, removal of reaction solution followed by repeated washing of the powder with distilled water, and finally drying at 120° C. for 14 hours, yielded 2.119 grams of dark gray solid. The dark deposits were shown by ESCA to be $Pt^0$ with only the two signals of O-valent platinum at 75.4 and 71.85 eV present.

It was further observed that the distribution of platinum on the powders was fairly uniform. Scanning electron microscopy could not detect any agglomerates.

The platinized $TiO_2$ powders thus provided were used in processes for the heterogeneous photocatalytic decarboxylation of saturated carboxylic acids, and were found to be especially useful as catalysts in such processes.

EXAMPLE 2

A titanium dioxide powder was prepared in accordance with Example 1.

A metallizing solution was prepared comprising sodium hexachloroplatinum (IV) in water. The pH of the solution was approximately 6, and the temperature of the solution was brought to 60° C.

The powder was suspended in the metallizing solution to form a reaction mixture.

The reaction mixture was irradiated for 21 hours in the same manner as indicated in connection with Example 1, above. After this period of time, it was observed that the powder had darkened significantly. After separation, it was found that the powder had gained 62 milligrams of weight (total weight was 962 milligrams) presumably owing to the deposition of metallic platinum.

It was observed that the reaction was less efficient than that reported in Example 1, as in Example 2 the role of electron donor was provided by water rather than the carboxylic acid.

EXAMPLE 3

In this example, homogeneous photodecomposition was studied.

A sample of approximately 100 mg. of $Al_2O_3$ powders, white in color was provided.

A metallizing solution comprising a deaerated, buffered mixture of 7.5 ml. of chloroplatinic acid (approximately 0.11 M) was provided in 7.5 ml. of glacial acetic acid. The pH of the metallizing solution was approximately 4.

The $Al_2O_3$ powders were mixed in the metallizing solution to form a reaction mixture.

The reaction mixture was irradiated for 13.4 hours in the same manner as indicated in Example 1.

It was observed that the solution color first changed from bright orange to bright red (after about 7 or 8 hours, but no black solids were present) and at the end of the photolysis was a faint orange color.

It was found that 0.89 mmol. of carbon dioxide had been trapped as $BaCO_3$, and 131 mg. (0.67 mmol.) of metallic platinum had been photodeposited. The platinum thus photodeposited was once again found to give only the two ESCA signals of O-valent platinum (74.8 and 71.4 eV).

It was concluded from this experiment that platinum will deposit from chloroplatinic acid under these conditions onto a substrate even if the substrate is not light-absorbing.

EXAMPLE 4

100 mg. of anatase powder, unreduced, was provided. The powder was obtained from Matheson, Coleman & Bell, and was determined by X-ray diffraction to exceed 99% in the anatase crystalline form. BET measurements ascertained that the $TiO_2$ powder had a surface area in excess of 15 $m^2/g$.

15 ml. of a dilute aqueous solution of copper sulfate was prepared as a metallizing solution. The copper sulfate was reagent grade also obtained from Matheson, Coleman & Bell. The pH of the solution was adjusted to 6.5 by the addition of $Na_2CO_3$. The initial copper concentration ($Cu^{2+}$) was measured at 8.4 micrograms per milliliter.

The anatase powder was added to the metallizing solution to form a reaction mixture.

The reaction mixture was contained in an undivided Pyrex cell with a flat window for irradiation. The reaction mixture was irradiated with an unfocused 6000 W Xe lamp operated at 5000 W. The lamp was a Model 600-WR "Weatherometer" obtained from Atlas Electric Devices Co. of Chicago, Illinois. Nitrogen was bubbled through the reaction mixture before and during the experiment to remove oxygen. The cell was contained in a Pyrex waterbath, which absorbed infra-red radiation from the lamp, and magnetic stirring was used to agitate the mixture during irradiation.

The reaction mixture was irradiated in the manner described above for a total of 8 hours.

Following irradiation, the copper concentration of the solution was determined spectrophotometrically. The pH of the solution was adjusted to 5 and it was then extracted with 20 ml. of chloroform containing 8-hydroxyquinoline. The absorbance of the copper 8-hydroxyquinoline complex was measured at 410 nm. Absorbance measurements were made with a Cary 14 Spectrophotometer, obtained from Applied Physics Corp. of Monrovia, California.

The copper concentration was then determined by comparison with a calibration curve prepared by treatment of standard solutions by the same procedure. In this example, the copper removal was measured at 41%.

EXAMPLE 5

100 mg. of titanium dioxide powder were provided in the same manner as indicated in Example 4 above.

15 ml. of aqueous solution of copper sulfate, having an initial copper concentration of 62.4 micrograms per milliliter, was provided in the same manner as indicated in Example 4 above.

The titanium dioxide powder was added to the copper sulfate solution to give a reaction mixture. The pH of the reaction mixture was adjusted to 6.5.

The reaction mixture was exposed to the sun for 16 hours.

At the end of this period, the copper removal was measured in the same manner as indicated in Example 4 above, at 54%.

EXAMPLE 6

100 mg. of titanium dioxide power in the anatase, reduced form was provided. The reduced form was prepared by heating the powder in a quartz tube under $H_2$ at 500° C.

15 ml. of a dilute aqueous solution of copper sulfate was provided, in the manner indicated in Example 4 above, and the initial copper concentration was measured at 4.2 $\mu$g/ml.

The $TiO_2$ powder was added to the copper sulfate solution to provide a reaction mixture. The pH of the reaction mixture was 6.5.

The reaction mixture was irradiated in the same manner as indicated in Example 4 above, for a period of 2 hours.

Following irradiation, the copper concentration of the solution was determined in the manner indicated in Example 4 and in this case, it was found that 83% of the copper had been removed.

EXAMPLE 7

100 mg. of $WO_3$ powder was provided. The $WO_3$ powder, which was purchased from Apache Chemicals, Inc., was found to be 99.9% pure and to have a surface area of approximately 15 $m^2/g$.

15 ml. of a dilute aqueous solution of copper sulfate was provided in the same manner as indicated in Example 4 above.

The tungstic oxide powders were added to the copper sulfate solution to provide a reaction mixture. The pH of the reaction mixture was 6.5, and the initial copper concentration of the reaction mixture was measured at 4.2 micrograms per milliliter.

The reaction mixture was irradiated, in the same manner as indicated in Example 4 above, for 3.5 hours.

Following irradiation, the copper concentration was determined in the manner indicated in Example 4 above, and it was found that 45% of the copper had been removed from the reaction mixture.

EXAMPLE 8

1.010 grams of $TiO_2$ in the anatase, unreduced form was provided.

20 ml. of an aqueous solution of copper sulfate having an initial $Cu^{2+}$ concentration of 10.5 mg/ml was provided as a metallizing solution. The pH of the metallizing solution was 6.5.

The $TiO_2$ powders were added to the metallizing solution to form a reaction mixture.

The reaction mixture was contained in an undivided Pyrex cell with a flat window for irradiation. The reaction mixture was irradiated with a 2500 W Hg-Xe lamp operated at 1600 W. The lamp was a Model UR 30 KK from Christie Electric Corp. of Los Angeles, California. Nitrogen was bubbled through the reaction mixture before and during the experiment to remove oxygen. The cell was contained in a Pyrex waterbath, which absorbed infra-red radiation from the lamp, and magnetic stirring was used to agitate the reaction mixture during irradiation. The light was focused by a convex quartz lens between the lamp and the cooling bath onto the flat window of the cell.

The reaction mixture was irradiated in the manner described above for 24 hours.

Following irradiation, the powders were recovered, washed thoroughly with distilled water, and dried for 12-14 hours at 110° C. At this temperature the surface deposit is converted to CuO, which resulted in a color change of the deposit from reddish brown to gray. The copper concentration was determined in the same manner indicated in Example 4 above. In this example, it was found that 1.4 mg. of copper had been deposited.

EXAMPLE 9

0.500 grams of $TiO_2$ powders in the anatase, reduced form as explained in Example 6 above were provided.

20 ml. of an aqueous copper sulfate solution having an initial $Cu^{2+}$ concentration of 15.9 mg/ml were provided as a metallizing solution. The pH of the metallizing solution was 6.5.

The $TiO_2$ powders were added to the copper sulfate solution thus provided to form a reaction mixture.

The reaction mixture was irradiated in the same manner as indicated in Example 8 above, for 24 hours. At the end of this period, it was determined, in the same manner as in Example 8, that the copper deposition was 2.8 mg.

EXAMPLE 10

100 mg. of $TiO_2$ powder in the anatase, unreduced form was provided as in Example 4 above.

15 ml. of an aqueous solution of copper sulfate having therein 13 ml. of glacial acetic acid, reagent grade, was provided as a metallizing solution. The pH of the solution was 3 and the initial $Cu^{2+}$ concentration was measured at 8.4 µg/ml.

The $TiO_2$ powders thus provided were added to the metallizing solution to form a reaction mixture.

The reaction mixture was irradiated for 2.25 hours in the manner indicated in Example 8 above.

Following irradiation, the copper concentration was ascertained in the manner indicated in Example 4 above, and the copper removal was determined to be 87%.

EXAMPLE 11

Example 10 was repeated except that the metallizing solution contained only 7.5 ml of glacial acetic acid, and the pH of the metallizing solution was 6. The initial $Cu^{2+}$ concentration of the metallizing solution was 4.2 µg/ml.

The sample was irradiated in the manner indicated for Example 10, for 2 hours.

Copper removal was measured at 82%.

EXAMPLE 12

Example 11 was repeated except that the amount of glacial acetic acid was reduced to 1.0 ml. The initial $Cu^{2+}$ concentration was the same as indicated for Example 11, as was the pH. The sample was irradiated for 2.25 hours, and the copper removal was determined to be 45%.

EXAMPLE 13

Example 11 was repeated except that the $TiO_2$ powders were in the anatase, reduced form as provided in Example 6 above.

As in Example 11, 7.5 ml. of glacial acid were in the metallizing solution, and the initial $Cu^{2+}$ concentration was 4.2 µg/ml. The pH of the solution was measured at 3.3

The sample was irradiated for 2 hours, and it was determined that only 3.7% of the copper was removed from the sample.

EXAMPLE 14

Example 13 was repeated, except that the pH was adjusted to 6 and the initial $Cu^{2+}$ concentration was 8.4 µg/ml.

The sample was irradiated for 5 hours, and the copper removal was measured at 68%.

EXAMPLE 15

100 mg. of $TiO_2$ powders in the rutile, reduced form were provided. The rutile powders were prepared by heating under $H_2$ at 900° C. for 5-6 hours, which resulted in about 99% conversion to the rutile crystalline form.

A metallizing solution identical to that provided in Example 11 above was provided.

The rutile powders were added to the metallizing solution to form a reaction mixture.

The reaction mixture was, as in Example 11 above, irradiated for a period of 2 hours.

Following irradiation, it was determined that copper removal was only 3.7%.

EXAMPLE 16

As a control experiment, the metallizing solution provided in Example 13 was irradiated in the manner indicated in that example for 2 hours.

Following irradiation, it was determined that no copper had been removed from the metallizing solution.

EXAMPLE 17

1.006 grams of $TiO_2$ powders in the anatase, unreduced form as specified in Example 4 above were provided.

20 ml. of an aqueous solution of copper sulfate was provided, containing 10 ml. of glacial acetic acid. The pH of this solution was measured at 3.3 and the initial $Cu^{2+}$ concentration was determined as 10.5 mg/ml.

The $TiO_2$ powders were added to the metallizing solution of copper sulfate to form a reaction mixture.

The reaction mixture was irradiated for 24 hours in the manner indicated in Example 8 above.

Following irradiation, it was determined that 47 mg. of copper had been deposited, the copper being determined as CuO.

EXAMPLE 18

Example 17 was repeated except that for this experiment only 0.500 gram of $TiO_2$ powder was employed in the reaction mixture. The pH was measured at 5 rather than 3.3, but the initial copper concentration was the same as indicated in Example 17.

Following irradiation for 24 hours in the same manner as in Example 17, it was determined that 17 mg. of copper had been deposited.

EXAMPLE 19

Example 17 was repeated except that the pH of the metallizing solution was 5 instead of 3.3.

Following irradiation, it was found that 8.3 mg. of copper had been deposited.

EXAMPLE 20

0.495 grams of $TiO_2$ powders in the anatase, reduced form were provided.

A metallizing solution identical to that used in Example 17 was provided. The $TiO_2$ powders were added to the metallizing solution to form a reaction mixture.

The reaction mixture was irradiated in the same manner as indicated in Example 17 above, and for the same time.

Following irradiation it was determined that 54 mg. of copper had been deposited.

EXAMPLE 21

Example 20 was repeated, except that the amount of $TiO_2$ powder was 0.500 grams, and the pH of the solution was 5 instead of 3.3.

Following irradiation in the same manner as indicated in Example 20, it was determined that 59 mg. of copper had been deposited.

EXAMPLE 22

Example 20 was repeated except that the weight of $TiO_2$ powder was 0.462 grams.

The metallizing solution and the irradition was the same as for Example 20.

Following irradiation, it was determined that 47 mg. of copper had been deposited.

EXAMPLE 23

1.002 grams of $TiO_2$ in the anatase, unreduced form as explained in Example 4 above were provided.

20 ml. of a metallizing solution were provided, including 10 ml. of glacial acetic acid and 10 ml. of $H_2PdCl_4$ (0.0941 M). The pH of the metallizing solution was adjusted to approximately 5.5 with solid $Na_2CO_3$.

The $TiO_2$ powders were added to the metallizing solution to form a reaction mixture.

Nitrogen gas was bubbled through the reaction mixture to exclude oxygen.

The reaction mixture was irradiated for 4 hours in the same manner as indicated above in connection with Example 8. After 1 and ½ hours, a visible color change was noted in the powder.

Following irradiation, the powder was recovered and washed with distilled water, and then the powder was dried for 2 hours at 100° C. The dried powder was gray in color.

The weight of the final powder was measured at 1.086 grams, thus indicating that 0.084 grams of palladium had been deposited.

The percentage of total palladium deposited deposted was 7.8%.

EXAMPLE 24

1.001 grams of $SnO_2$ powders were provided.

20 ml. of a metallizing solution was provided which included 10 ml. $H_2PtCl_6$ [20 mg/ml $Pt^{(iv)}$] and 10 ml. glacial acetic acid. The pH of the metallizing solution was adjusted to approximately 5.5 by the addition of $Na_2CO_3$. Nitrogen gas was bubbled through the solution to remove $O_2$.

The $SnO_2$ powders were added to the metallizing solution to provide a reaction mixture.

The mixture was illuminated for 20 hours in the manner described in Example 8 above.

The powder was cleaned with water, dried and weighed. The total weight of the powder was 1.154 grams, meaning that 0.153 grams of platinum (13.3%) were deposited. The metallized powders thus produced were identical in appearance to those produced with $TiO_2$.

Examples 4 and 6-24 above were performed at about 55°-60° C., while Example 5 was performed at ambient outside temperature, about 85° F.

Applicants believe that other semiconductor powders, such as GaAs, $SrTiO_3$, and $Fe_2O_3$, in addition to those illustrated in the foregoing examples, are useful in the methods of this invention.

It is believed that the mechanism of photodeposition follows that found in other heterogeneous photoprocesses at semiconductors. The photogenerated hole causes oxidation of the electron donor, such as acetate, while the photogenerated electron leads to reduction of the metal complex. With respect, for example, to the heterogeneous photodecomposition in the presence of acetate, the irreversibility of the oxidative decarboxylation of the acetate hinders any backreaction between the reduced metal species and oxidation product and suggests that carboxylic acids are excellent choices as electron donors for heterogeneous photoreductions.

It is found that the methods of catalyst preparation described above are particularly useful because high dispersion and small clusters of the metal on the support surfaces exist. Metal deposition is believed to occur near sites where photons strike the surface and the light flux can be made very small. The relatively low temperature conditions of the photodeposition processes of this invention will minimize surface diffusion of metal atoms which would produce larger aggregates.

From Example 3 above it was concluded that homogeneous photodecomposition will occur in the case of platinum (IV) in acetic acid, onto a substrate wherein the band gap [>7 eV in the case of aluminum oxide] is sufficiently wide to prevent light absorption by the solid. Such method is particularly useful in preparing metallized catalysts of $Al_2O_3$ or other inorganic oxide powders having wide band gaps.

Applicants believe that there is a potentially wide range of metals that might be photodeposited on semiconductor or inorganic oxide powders by this method. For aqueous suspensions of titanium dioxide, $M^{+n}/M$ couples with redox potentials positive of the $H^+/H_2$ potential (which corresponds closely to the flat-band potential of n-type $TiO_2$) should be available, with an even wider range possible in nonaqueous solvents. Applicants believe that metals such as silver, mercury and gold, in addition to those illustrated in the foregoing examples, may be deposited on such powders in accordance with the methods of this invention.

Several experiments have demonstrated the use of metallized powders produced in accordance with the methods of this invention as catalysts. For example, see the disclosures in the above-mentioned copending application, Ser. No. 024,520.

Platinized $TiO_2$ and $WO_3$ powders show high catalytic activity for the thermal hydrogenation of neat benzene (and cyclohexene) to cyclohexane at temperatures of about 80° C. and below. Similarly, platinized anatase powders result in efficient photocatalytic decarboxylation of saturated carboxylic acids as mentioned in the copending application referred to above.

Further, as mentioned above, the methods of this invention are useful for the removal of dilute concentrations of metals such as copper from waste streams such as industrial effluents, where other known methods may be inapplicable or inefficient.

Still further, the methods of this invention may have utility beyond the preparation of catalysts or treatment of waste streams. For example, the photodeposition of metals on solid substrates may be attractive for light controlled metal deposition in printed circuits.

While the methods of this invention have been described in terms of preferred embodiments, it will be apparent to those of skill in the art that various changes may be made in the methods disclosed without departing from the scope of the invention, which is defined by the following claims:

What is claimed is:

1. A method for the preparation of powders having a selected metal highly dispersed thereon, comprising:
   providing semiconductor powders;
   providing a metallizing solution comprising the selected metal in a suitable solvent;
   suspending said powders in the metallizing solution to form a reaction mixture; and
   irradiating said reaction mixture with visible or ultraviolet light at an intensity and for a time suitable to result in the highly dispersed deposition onto said powders of said metal.

2. The method in accordance with claim 1, wherein said metallizing solution includes acetate.

3. The product made in accordance with the method of claim 2.

4. The method in accordance with claim 1, wherein said powders are selected from the group comprising n-type titanium dioxide, tungstic oxide and tin oxide.

5. The product made in accordance with the method of claim 4.

6. The method in accordance with claim 1, wherein oxygen is removed from said metallizing solution prior to irradiation of the reaction mixture.

7. The product made in accordance with the method of claim 6.

8. The method in accordance with claim 1, wherein said solution is brought to a temperature of approximately 52°–60° C. prior to irradiation.

9. The product made in accordance with the method of claim 8.

10. The method in accordance with claim 1, wherein said metal is selected from the group consisting of platinum, palladium and copper.

11. The product made in accordance with the method of claim 10.

12. The method in accordance with claim 1, wherein said reaction mixture is irradiated for a time sufficient to result in a pronounced fading of color.

13. The product made in accordance with the method of claim 12.

14. The method in accordance with claim 1, wherein the ratio of powders to metallizing solution is from about 0.005 to about 0.05 g/ml.

15. The product made in accordance with the method of claim 14.

16. The product made in accordance with the method of claim 1.

17. A method for the preparation of powders having a selected metal highly dispersed thereon, comprising:
   providing semiconductor powders selected from the group consisting of $TiO_2$, $WO_3$ and $SnO_2$;
   providing a metallizing solution comprising a metal selected from the group consiting of platinum, palladium and copper;
   suspending said powders in the metallizing solution to form a reaction mixture; and
   irradiating said reaction mixture with visible or ultroviolet light at an intensity and for a time suitable to result in the highly dispersed deposition onto said powders of said metal.

18. The method in accordance with claim 17, wherein said metallizing solution includes acetate.

19. The product made in accordance with the method of claim 17.

20. The product made in accordance with the method of claim 18.

21. A method for the preparation of a powdered catalyst having a selected metal highly dispersed thereon, comprising:
   providing semiconductor powders;
   providing a metallizing solution comprising the selected metal in a suitable solvent;
   suspending said powders in the metallizing solution to form a reaction mixture;
   irradiating said reaction mixture with visible or ultraviolet light at an intensity and for a time sufficient to deposit said metal onto said powders in a highly dispersed manner; and
   drying said metallized powders to provide a metallized catalyst.

22. The method in accordance with claim 21, wherein said metallizing solution includes acetate.

23. The product made in accordance with the method of claim 22.

24. The method in accordance with claim 21, wherein said powders are selected from the group comprising n-type titanium dioxide, tungstic oxide and tin oxide.

25. The product made in accordance with the method of claim 24.

26. The method in accordance with claim 21, wherein oxygen is removed from said metallizing solution prior to irradiation of said reaction mixture.

27. The product made in accordance with the method of claim 26.

28. The method in accordance with claim 21, wherein said solution is brought to a temperature of approximately 52°–60° C. prior to irradiation.

29. The product made in accordance with the method of claim 28.

30. The method in accordance with claim 21, wherein said metal is platinum.

31. The method in accordance with claim 30, wherein said powders are anatase, reduced.

32. The product made in accordance with the method of claim 31.

33. The product made in accordance with the method of claim 30.

34. The method in accordance with claim 21, wherein the ratio of powders to metallizing solution is from about 0.005 to about 0.05 g/ml.

35. The product made in accordance with the method of claim 34.

36. The product made in accordance with the method of claim 21.

37. A method for the preparation of a powdered catalyst having platinum highly dispersed thereon, comprising:
   providing semiconductor powders selected from the group consisting of $TiO_2$, $WO_3$ and $SnO_2$;
   providing a platinizing solution comprising chloroplatinic acid;
   suspending said powders in the platinizing solution to form a reaction mixture;
   irradiating said reaction mixture with visible or ultraviolet light at an intensity and for a time suitable to result in the highly dispersed deposition onto said powders of said platinum; and
   drying said platinized powders to provide a catalyst.

38. The method in accordance with claim 37, wherein said platinizing solution includes acetate.

39. The product made in accordance with the method of claim 38.

40. The product made in accordance with the method of claim 37.

41. A method for removing metal ions from a waste stream having a dilute concentration of such ions, comprising:
   providing semiconductor powders;
   adding said powders to said waste stream to form a reaction mixture;
   irradiating said reaction mixture with visible or ultraviolet light at an intensity and for a time sufficient to result in a pronounced fading of color in said reaction mixture, indicating the deposition of metal ions therefrom.

42. The method in accordance with claim 41, wherein said metallizing solution includes acetate.

43. The product made in accordance with the method of claim 42.

44. The method in accordance with claim 41, wherein said powders are selected from the group comprising n-type titanium dioxide, tungstic oxide and tin oxide.

45. The product made in accordance with the method of claim 44.

46. The method in accordance with claim 41, wherein the ratio of powders to metallizing solution is from about 0.005 to about 0.05 g/ml.

47. The product made in accordance with the method of claim 46.

48. The method in accordance with claim 41, wherein said metal is copper.

49. The product made in accordance with the method of claim 48.

50. The product made in accordance with the method of claim 41.

51. A method for the preparation of powders having a selected metal highly dispersed thereon, comprising:
   providing inorganic oxide powders;
   providing a platinizing solution comprising platinum (IV) in a suitable solvent containing acetate;
   suspending said powders in the platinizing solution to form a reaction mixture; and
   irradiating said reaction mixture with visible or ultraviolet light at an intensity and for a time suitable to result in the highly dispersed deposition onto said powders of said platinum.

52. The method in accordance with claim 51, wherein said inorganic oxide powders are $Al_2O_3$.

53. The product made in accordance with the method of claim 52.

54. The product made in accordance with the method of claim 51.

55. A method for the preparation of a powdered catalyst having platinum highly dispersed thereon, comprising:
   providing inorganic oxide;
   providing a platinizing solution comprising chloroplatinic acid and acetic acid;
   suspending said powders in the platinizing solution to form a reaction mixture;
   irradiating said reaction mixture with visible or ultraviolet light at an intensity and for a time suitable to result in the highly dispersed deposition onto said powders of said platinum; and
   drying said platinized powders to provide a catalyst.

56. The method in accordance with claim 55, wherein said inorganic oxide powders are $Al_2O_3$.

57. The product made in accordance with the method of claim 56.

58. The product made in accordance with the method of claim 55.

* * * * *

UNITED STATES PATENT OFFICE
CERTIFICATE OF CORRECTION

Patent No. 4,264,421            Dated April 28, 1981

Inventor(s) Allen J. Bard; Wendell W. Dunn & Bernhard Kraeutler

It is certified that error appears in the above-identified patent and that said Letters Patent are hereby corrected as shown below:

Column 5, line 47, rewrite "power" as --powder--;

Column 7, line 38, after "glacial" insert --acetic--;

Claim 17, line 39, rewrite "consiting" as --consisting--.

Signed and Sealed this

Eleventh Day of August 1981

[SEAL]

Attest:

GERALD J. MOSSINGHOFF

Attesting Officer    Commissioner of Patents and Trademarks